US005303551A

United States Patent [19]

Lee

[11] Patent Number: 5,303,551

[45] Date of Patent: Apr. 19, 1994

[54] FLOW RATE CONTROL APPARATUS FOR OIL-HYDRAULIC PUMP

[75] Inventor: Jin-Han Lee, Chungchongnam-do, Rep. of Korea

[73] Assignee: Samsung Heavy Industries Co., Ltd., Changwon, Rep. of Korea

[21] Appl. No.: 981,218

[22] Filed: Nov. 25, 1992

[30] Foreign Application Priority Data

Nov. 30, 1991 [KR] Rep. of Korea .................... 91-21924

[51] Int. Cl.[5] .............................................. F16D 31/02

[52] U.S. Cl. ......................................... 60/431; 60/452; 91/518; 417/34

[58] Field of Search ................. 60/420, 422, 431, 432, 60/445, 446, 452, 428; 91/511, 518; 417/34

[56] References Cited

U.S. PATENT DOCUMENTS

| | | | |
|---|---|---|---|
| 4,559,777 | 12/1985 | Leiber | 60/422 |
| 4,579,021 | 4/1986 | Yamamuro et al. | 74/868 X |
| 4,618,036 | 10/1986 | Ideta | 192/3.3 |
| 4,741,159 | 5/1988 | Gunda et al. | 60/446 X |
| 4,742,676 | 5/1988 | Kropp et al. | 60/432 |
| 4,936,340 | 6/1990 | Potter et al. | 137/487.5 |
| 4,984,811 | 1/1991 | Kuwabara et al. | 277/58 X |
| 5,048,293 | 9/1991 | Aoyagi | 60/452 X |
| 5,063,740 | 11/1991 | Aihara | 60/432 |
| 5,111,660 | 5/1992 | Gettel | 60/468 |
| 5,155,996 | 10/1992 | Tatsumi et al. | 60/452 X |
| 5,167,121 | 12/1992 | Sepehri et al. | 60/422 |
| 5,174,114 | 12/1992 | Aoyagi | 60/431 X |

*Primary Examiner*—Edward K. Look
*Assistant Examiner*—Hoang Nguyen
*Attorney, Agent, or Firm*—Antonelli, Terry, Stout & Kraus

[57] ABSTRACT

The present invention relates to a flow rate control apparatus for a hydraulic pump which is employed suitably in a hydraulic excavator or a hydraulic crane and driven by a rotating force of a motor. The flow rate control apparatus controls the discharging flow rate of the hydraulic pump to utilize the output power of the motor without an overload applied to the motor, and optimally controls the output flow rate of the pump depending upon an operation signal to provide an excellent operating characteristic to an operator under a high load operating condition applied to a hydraulic machine having hydraulic actuators driven on the basis of the discharge flow of the hydraulic pump.

3 Claims, 6 Drawing Sheets

FLOW RATE CONTROL APPARATUS FOR OIL-HYDRAULIC PUMP

BACKGROUND OF THE INVENTION

1. Field of the Invention

The present invention relates to a flow rate control apparatus for a oil-hydraulic pump which is employed suitably in a hydraulic excavator, a hydraulic crane or the like and driven by a rotation force from of a motor. More particularly, the present invention relates to a flow rate control apparatus which controls the flow rate discharged from an oil-hydraulic pump to utilize the output power of a motor without overload applied to the motor, and optimally controls the output flow rate of the pump depending upon a manipulated signal to assure an excellent operation capability to an operator under a high load operation condition of a hydraulic machine system with a hydraulic actuator driven on the basis of the discharged flow rate of the oil-hydraulic pump.

2. Description of the Prior Art

In general, a recently proposed hydraulic driving circuit is designed such that the output power of a motor is utilized to its maximum to improve working efficiency. In many cases, according to such a conventional hydraulic driving circuit, the maximum output P of the motor is previously set in consideration of working and load conditions to significantly reduce undesirable energy loss.

More specifically, a variable capacity oil-hydraulic pump has a discharge flow rate determined from a product of the rotational speed of the motor and the inclination-changed value of the inclined plate in the pump. The flow rate discharged from the pump is thus increased in accordance with the inclination-changed value of the inclined plate in the hydraulic pump.

The hydraulic pump is driven by the motor, and as the torque of the oil-hydraulic pump is larger than the output power of the motor, the motor may be overloaded causing the rotational speed of the motor to drop, possibly resulting in that the motor being stopped of the overload to the motor is applied continuously.

For that reason, a regulator is disposed to adjust the inclination of the inclined plate in the pump so as to limit the input torque. With this regulator arrangement, the input torque of the oil-hydraulic pump is limited in a range of the output power of the motor and the output power of the motor is effectively utilized. More specifically, the regulator receives the pressure feed-back from the pump. As the pressure is gradually increased, the regulator properly limits the discharging flow rate of the pump. On the contrary, as the pressure is decreased, the regulator serves to reduce the flow rate so as to effectively utilize the output power of the motor.

With the construction described above, however, since the hydraulic circuit is employed in order to achieve the principle object thereof, the construction is complicated and, hence, the process of fabricating the circuit is also difficult. Further, a technical limit in the process of fabricating the circuit is present, resulting in the decrease in efficiency of the circuit.

Furthermore, the hydraulic circuit for limiting the output level of the hydraulic pump or a hydraulic circuit having an arrangement discharging a flow rate proportional to the manipulating means such as a lever or pedal may be complicated in structure.

In addition, the hydraulic pump discharges a flow rate proportional to the manipulating means at a lower load condition, while the pump discharges the maximum flow rate regardless of the manipulated variable when the manipulated angle of the inclined plate is gradually changed to a higher load condition. As a result, the operational area available to the operator is relatively reduced and the limitation in operation is also undesirable.

In order to solve the above drawbacks, a control apparatus for load sensing hydraulic driving circuit is proposed in Japanese patent laid-open publication No. 2-275101. With the control apparatus, when the discharging flow rate of oil-hydraulic pump is in a saturated condition, a correction of the total flow rate consumed by a pressure correctable flow rate control valve is executed with a substantially improved manipulation capability. Also, the control apparatus suitably controls the pump without a hunting phenomenon in controlling the pump.

SUMMARY OF THE INVENTION

Accordingly, a principle object of the present invention is to provide a flow rate control apparatus for a hydraulic pump, which compares a desired flow rate proportional to the manipulated variable previously set by an operator and a maximum dischargeable flow rate of a hydraulic pump according to the maximum output of a motor, and easily operates the desired discharge flow by means of a controller, embodying a regulator having a simple construction and improves the manipulation capability of the hydraulic pump.

Another object of the present invention is to provide a flow control apparatus for a hydraulic pump, which detects the output power of the pump and operates the maximum dischargable flow of the pump to substantially increase the output power of the pump under a limited output of a motor which improves energy efficiency and manipulation performance.

Further object of the present invention is to provide a flow control apparatus for a hydraulic pump wherein a characteristic curve of the pump required for a given working operation can be embodied by means of a controller instead of a mechanical means which prevents energy of the pump from being undesirably lost.

Still another object of the present invention is to provide a flow control apparatus for a hydraulic pump, which can control the flow rate discharged from the pump in proportion to the maximum manipulated angle set by an operator under a higher load region of the pump which improves the manipulation capability of the pump to be smooth and fine.

To achieve the above objects, the present invention is a flow control apparatus for a hydraulic pump, having at least one capacity variable oil-hydraulic pump driven by rotation of a motor, a plurality of hydraulic actuators driven according to the flow rate discharged from the hydraulic pump, flow control valves for adjusting the flow direction and amount of a working oil transferred from the hydraulic pump to the actuators and a control means for converting the manipulated variable into electric signal (voltage or current), the apparatus comprising: an output selector means having an electric control device limiting the output power level of a motor and controlling an inclination changed angle of an inclined plate in the variable capacity hydraulic pump to adjust the discharging flow rate of the pump; electromagnetic proportional pressure reducing valves for receiving a pressurized fluid from a pump generating a constant fluid pressure based upon control signal, and generating a pilot pressure depending upon the input electric signal to control the regulator; a first discharging pressure detector means for detecting the discharging pressure of the variable capacity hydraulic pump; and, a controller for controlling the input and output signals of each of the circuit components.

According to the present invention, when the manipulating means is driven to perform work required by an operator, the flow rate required for the operation of each of the actuators is operated in accordance with the manipulated variable signal. Thus the required flow rate is used to calculate the opening magnitude of the flow control valve. Consequently, the desired pump input flow is produced by summing the desired flow rate and the maximum dischargeable flow related to the load condition to be produced from the discharge pressure detected by the first detector means based upon the output power specified previously set through the output selector means.

The desired pump input flow rate thus produced is compared with the maximum dischargeable flow by means of a comparator means. As the comparison result, if the desired pump input flow is larger than the maximum dischargeable flow, then the maximum dischargable flow is set as the pump output value. Alternatively, if the desired pump input flow is equal to or lower than the maximum dischargeable flow, then the desired pump input flow is output as the pump output value.

Consequently, the pump output value is converted into electric signal by the output means to control an electromagnetic pressure reducing valve and pilot pressure corresponding to the electrically converted output value is produced to drive the regulator so that the inclination changed angle of the inclined plate is moved to a predetermined position so as to discharge the desired flow rate.

Accordingly, the output of the motor can be utilized to its maximum so that the output of the hydraulic pump is increased to discharge the desired flow rate to thereby reduce the flow loss effectively.

To select the output of the motor, a second detector means is provided to detect the rotational speed of the motor. The first detector means detects the pressure of the pump so as to calculate the dischargeable pump flow rate.

That is, the output of the motor may be decreased in working due to a mechanical deflection under a condition of the same rotational speed of the motor. At this time, if the load is acted on the motor, then the rotational speed of the motor is below a reference speed. Accordingly, the discharging flow rate is corrected to adjust the dischargeable pump flow, so that the flow rate discharged from the pump is reduced under the same load condition.

Furthermore, a plurality of the third detectors are provided to detect the driving speed of the actuators without the operation of the dischargable pump flow rate achieved by using the first detector means. Accordingly, the third detectors detect the driving speed of the actuators to enable the dischargable pump flow rate to be calculated from the flow rate supplied to the actuators. Then, the speed of the motor is detected by the second detector means to compensate for the deflection in the flow rate produced due to the variation of the load, thereby calculating the maximum dischargeable flow rate of the hydraulic pump.

In the operation of the desired pump input flow, the manipulating means is always controlled by an operator on the basis of the desired flow level of the manipulator developed depending upon the magnitude of the load thereby achieving the operation of the desired flow rate.

The above and other objects, features and advantages of the invention will be apparent from the following description taken with reference to the accompanying drawings.

DETAILED DESCRIPTION OF THE INVENTION

Now, a preferred embodiment of the present invention will be described in detail.

Figure 1:
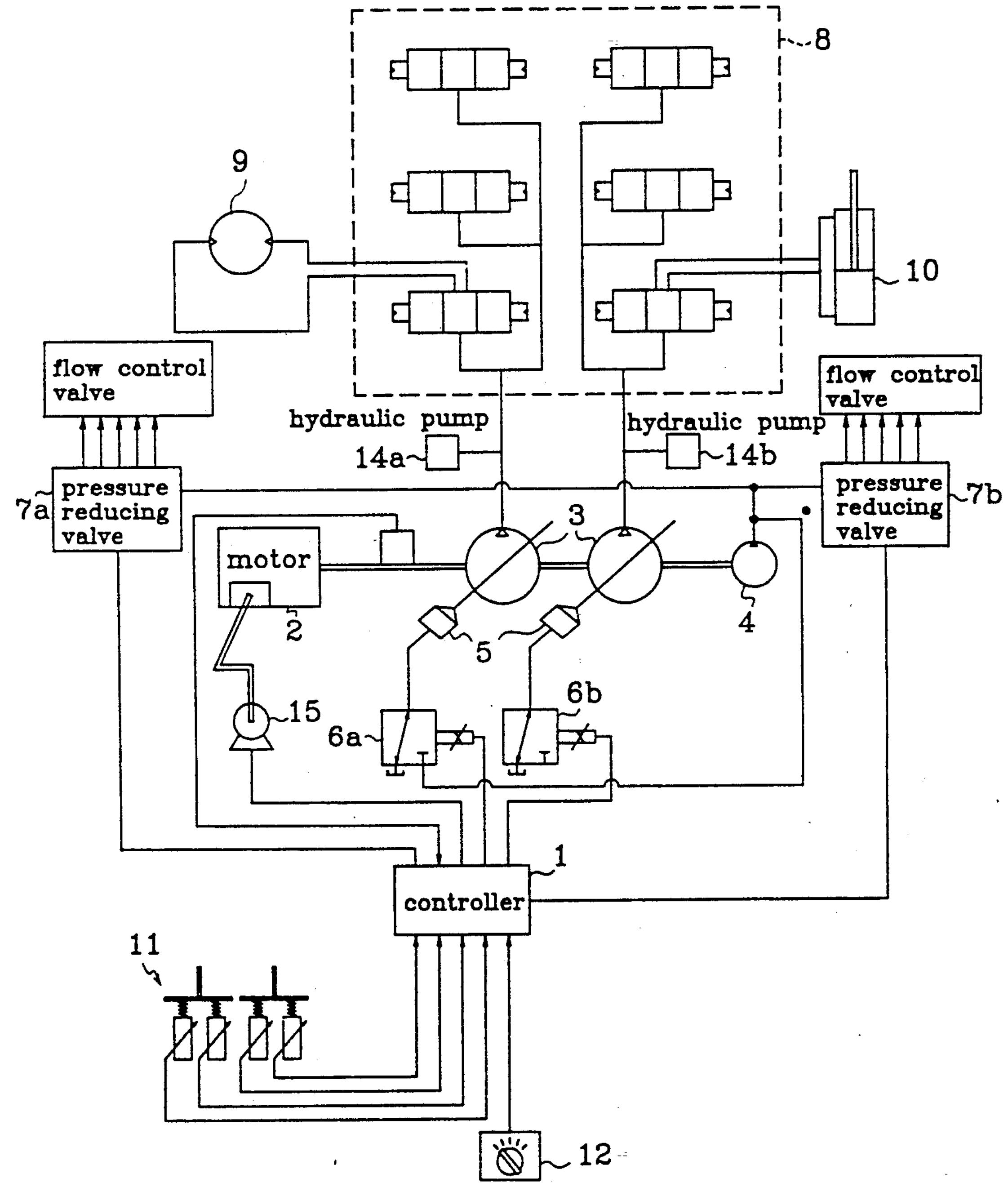
FIG. 1 is a view showing hydraulic circuit of a flow rate control apparatus according to a preferred embodiment of the present invention.
Figure 2:
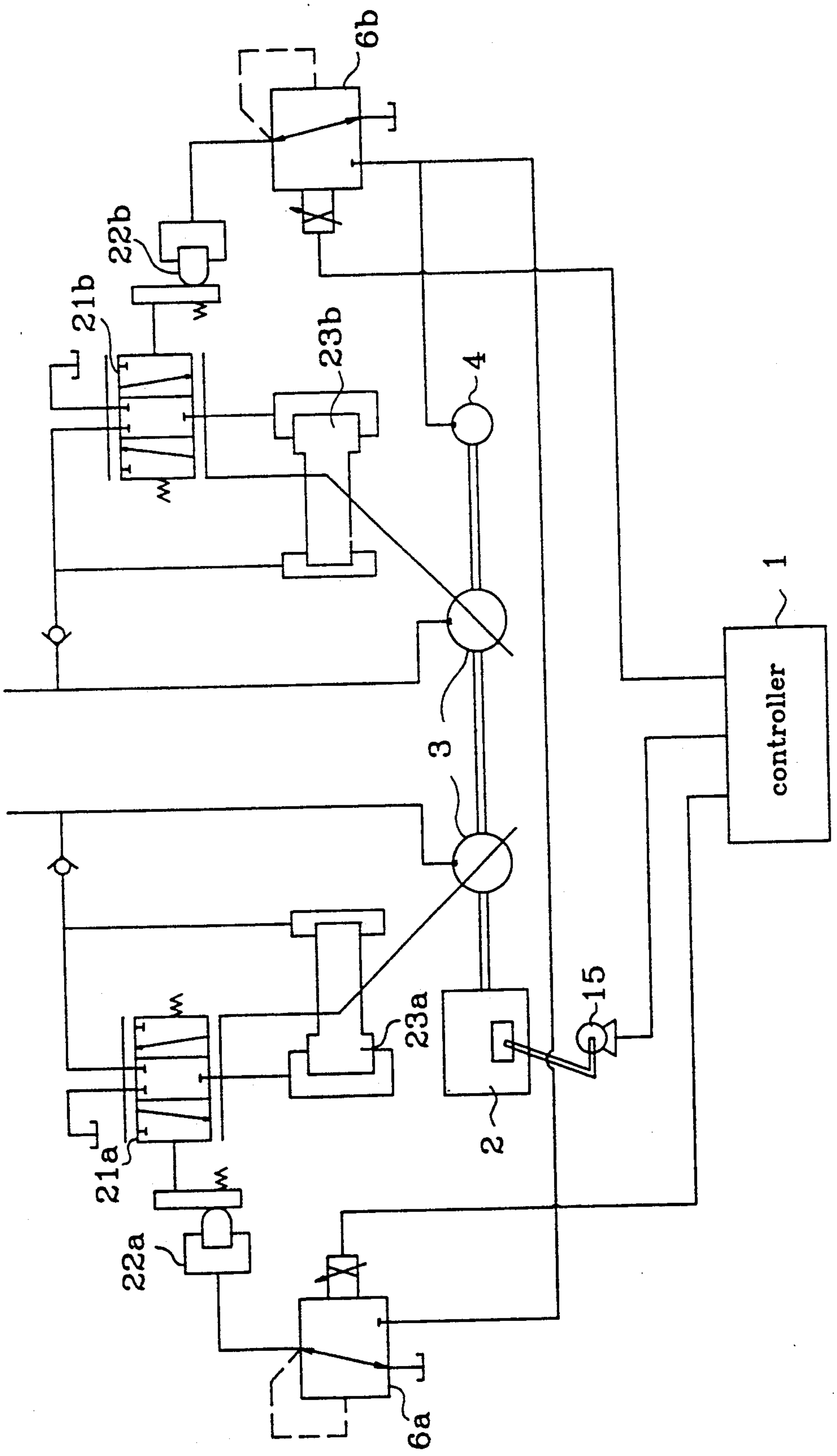
FIG. 2 is a detailed circuit diagram of a regulator shown in FIG. 1.
Figure 3:
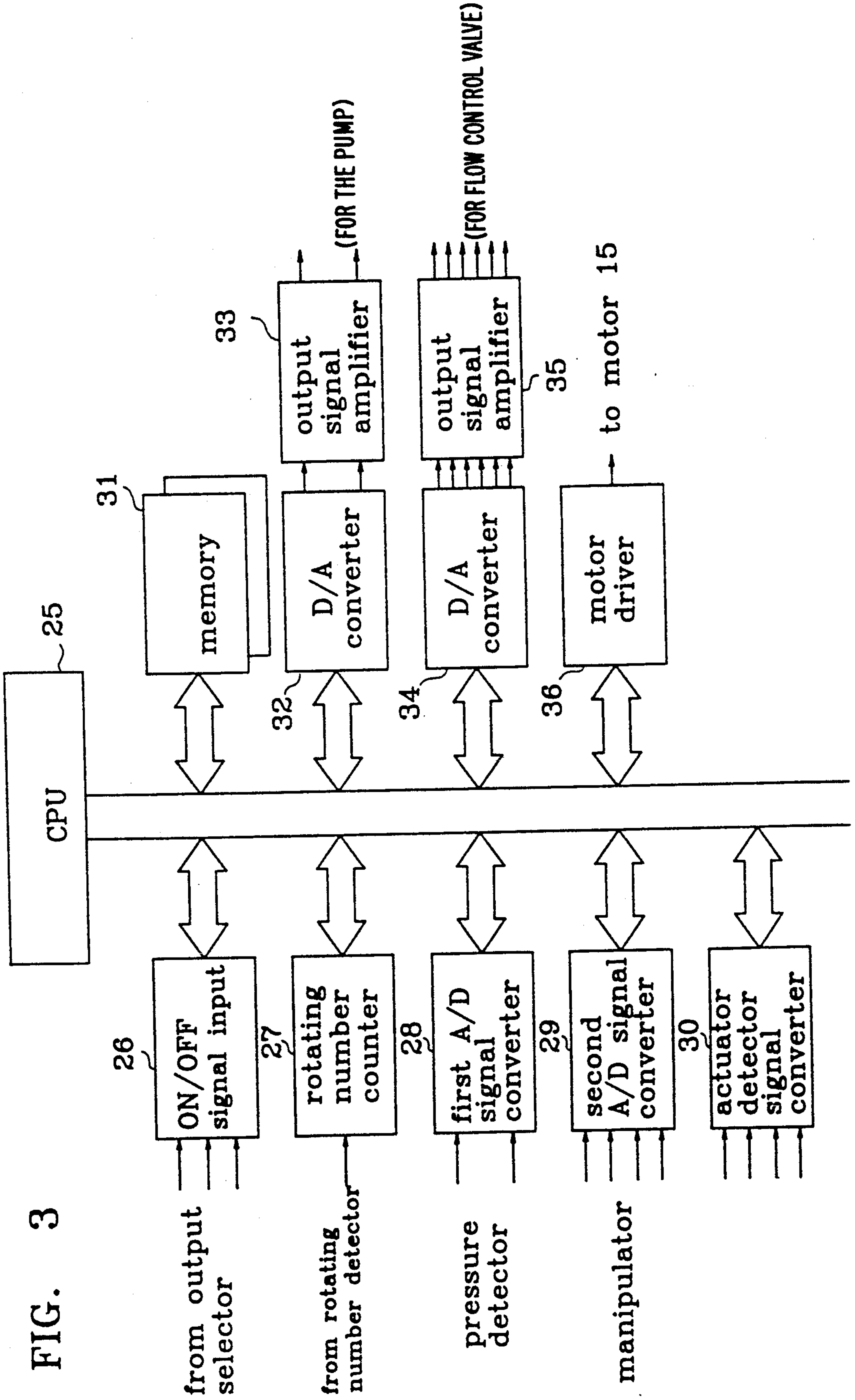
FIG. 3 is a schematic view showing the internal structure of a controller in FIG. 1.
Figure 4:
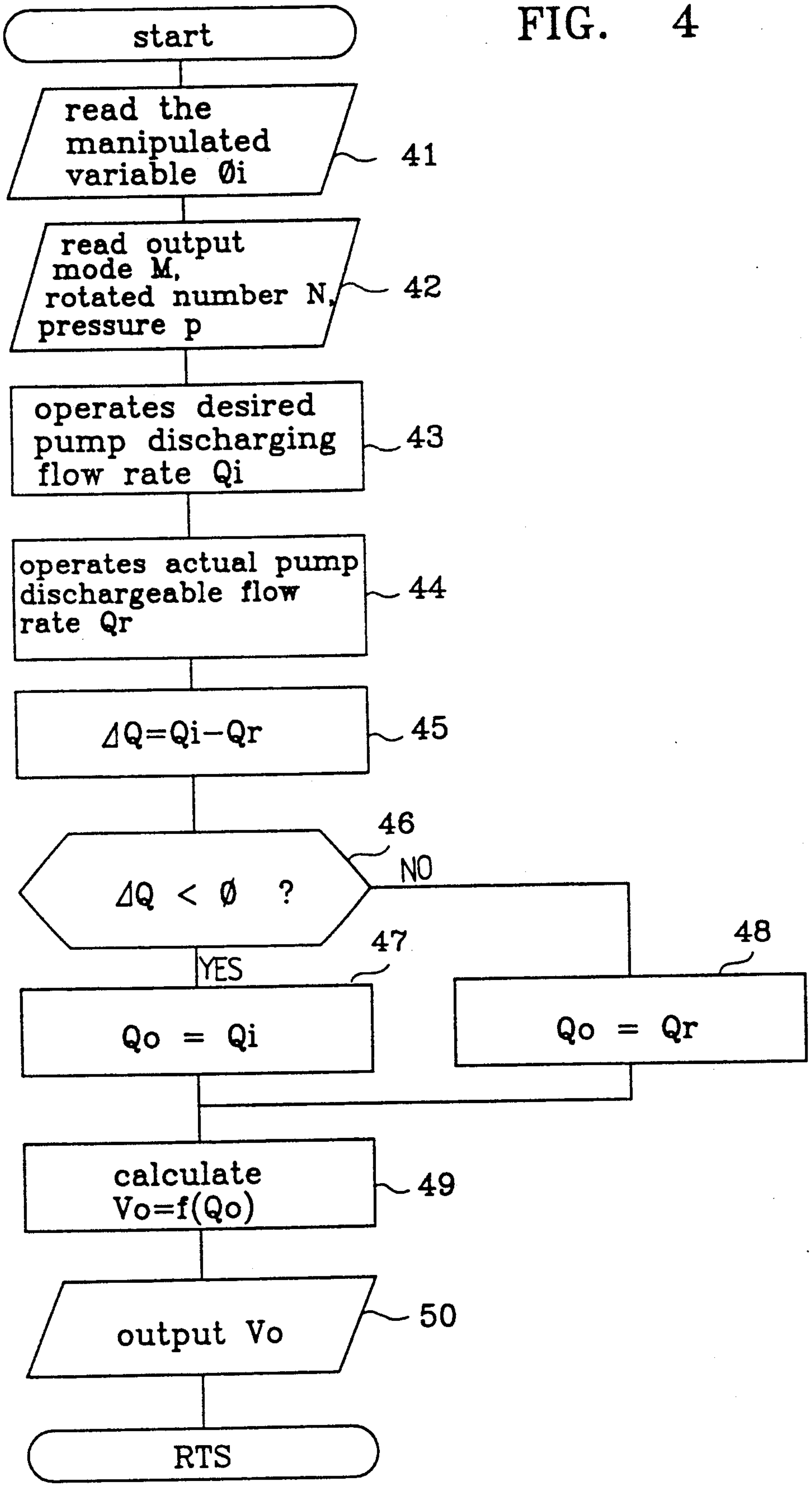
FIG. 4 is a flow chart illustrating a control program executed by the control apparatus.

Referring to FIGS. 1 to 4 wherein FIG. 1 is a view showing hydraulic circuit of a flow rate control apparatus according to a preferred embodiment of the present invention; FIG. 2 is a detailed circuit diagram of a regulator shown in FIG. 1; FIG. 3 is a schematic view showing the internal structure of a control in FIG. 1, and FIG. 4 is a flowchart illustrating a control program executed by the control apparatus, a central processing unit (CPU) 25 functions to control the control of the discharge control apparatus embodying the present invention on the basis of the control program stored in a memory 31 such as a ROM.

Figure 5:
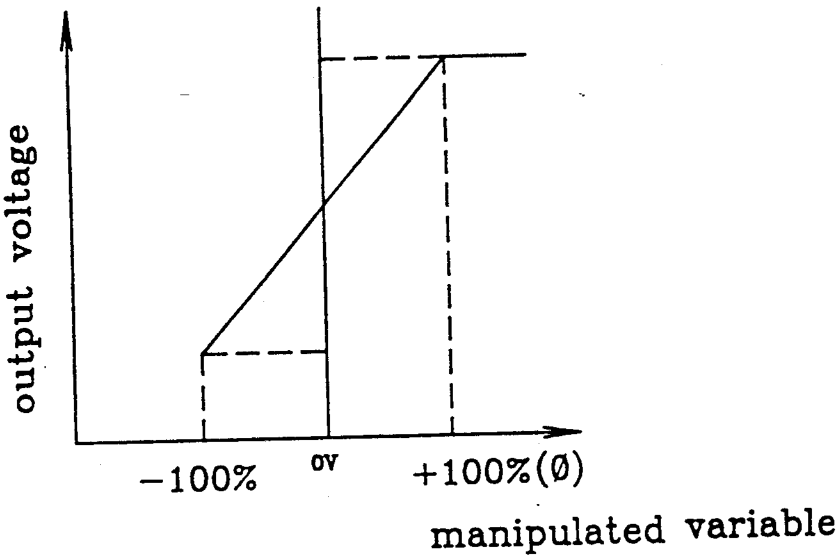
FIG. 5 is a graph showing a characteristic of the output voltage to the manipulated variable of a manipulator according to the present invention.

More specifically, when an electric signal (current or voltage) according to manipulated variable input $\phi i$ is input from a manipulator 11, the manipulated variable $\phi i$ is entered through an analog to digital converter 29 to the CPU 25 at a step 41. A characteristic diagram of the manipulated variable $\phi i$ and the electric signal Vi is defined such that it denotes a proportional output characteristic as shown in FIG. 5.

At a step 42, a second detector 9 detects a mode M selected by an output selector 12 and detector 15 detects the speed N of a motor.

The first detectors 14_a_ and 14_b_ detect the discharge pressure P, that is, load pressure of variable capacity hydraulic pump 3. The selected mode M and the rotational speed N detected by the second detector and the discharging pressure detected by the first detectors 14a and 14b are input to the CPU 25, respectively. The detector 15, which may be constructed such that a gear arrangement, is formed to define a rotating part of the motor 2 through a magnetic sensor so as to count the number of the gear teeth as the speed of the motor by way of a rotating counter 27. The first detectors 14a and 14b may be one of generally well-known semiconductor sensors having the output voltage characteristic proportional to the variation of the pressure.

After the pressure signal is input to the CPU 25 through an analog to digital converter 28, the CPU 25 produces a pump discharge rate Qi corresponding to the manipulated variable $\phi 1$ previously read at the step 41. The value Q1 can be determined according to the manipulated variable $\phi 1$ by using an equation (or data) of $Q1=f(\phi 1)$, that is, the specified value previously set as the value shown in FIG. 9.

When several manipulators 11 are used, they may designate different characteristics, respectively. In this case, the desired pump discharge rate Q1 can be obtained by summing the manipulated variables of the manipulators.

At a step 44, the actual dischargeable pump flow rate Qr is calculated by the CPU 25. At step 44, the characteristic of the motor 2 is defined in accordance with the output mode in which the maximum output of the motor 2 is limited. Then, the output power of the pump assured at the pressure P can be produced by the following equation under the characteristic curve of the motor 2: That is, $$W=P\cdot Qr=P\cdot D\cdot N$$

where, Q=D·N; and P denotes load pressure, D denotes the discharge rate of the pump once every revolution of the motor, W denote the output power of the motor and N denotes the speed of the motor 2.

Accordingly, the actually dischargeable flow rate Qr of the pump 3 can be set at a range of the maximum output in which no overload is for the motor 2 occurs.

Sequentially, at a step 45, a deflection ΔQ is calculated between the desired pump discharging rate Q1 and the actually dischargeable flow rate Qr. If the deflection ΔQ is below the value "0", that is, when the desired pump discharge rate Q1 is lower than the actual dischargeable flow rate Qr, the desired pump discharge rate Q1 is set as a pump discharging rate QO, at a step 47. On the contrary, if the deflection ΔQ is equal to or lower than the value "0", that is, when the desired discharge rate Q1 is equal to or lower than the actually dischargeable flow rate Qr, this means that an overload is occurring on the pump and, hence, the actually dischargeable flow rate Qr is set as a pump discharge flow rate QO to limit the output of the pump.

Figure 6:
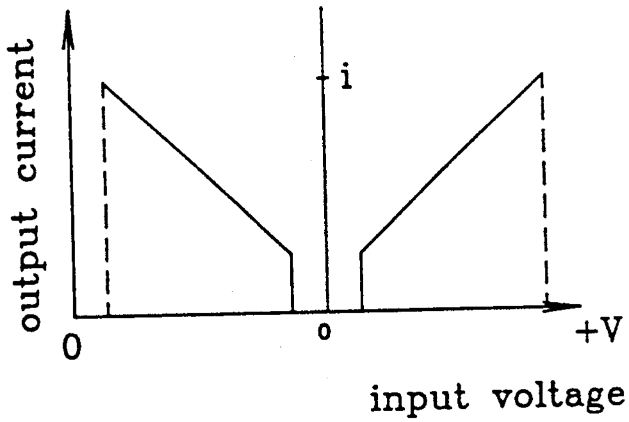
FIG. 6 is a graph showing a characteristic between the input current and output voltage of a dc amplifier in FIG. 1.
Figure 7:
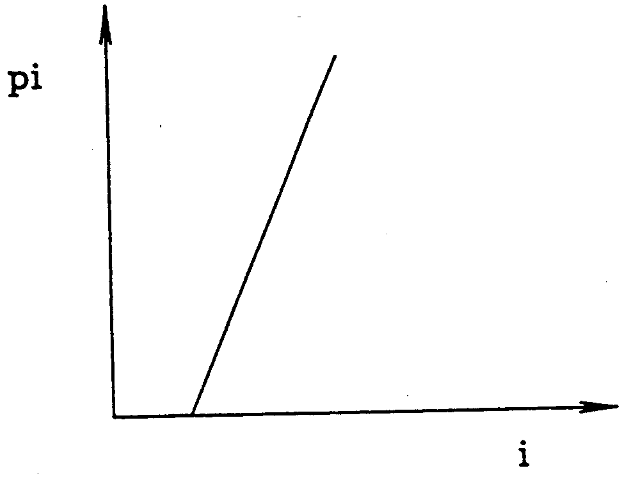
FIG. 7 is a graph showing an input and output characteristic of the electromagnetic pressure reducing valve shown in FIG. 1.

Consequently, if at a step 49 the CPU 25 produces the output voltage VO needed to assure the pump discharge flow rate QO, the voltage is output through a digital to analog converter 32 in the controller 1 and converted into a current value $I_o$ by means of an amplifier 33 in accordance with the characteristic diagram as shown in FIG. 6 so as to drive the electromagnetic proportional pressure reducing valves 6a and 6b.

The electromagnetic proportional pressure reducing valves 6a and 6b produce the difference of the output pilot pressure P1 to the output current $I_o$ on the basis of the pilot pressure supplied from the third pump (gear pump) 4 which generates the pressurized flow serving as a control signal and then moves the inclination changed angle Q in accordance with the pressure P1 so that the desired flow rate is discharged from the pump.

As described above, according to the present invention, the desired flow rate can be assured correctly and the maximum output of the motor can be produced in a range in which no overload acts upon the motor with result that the motor can be improved with efficiency.

Figure 8:
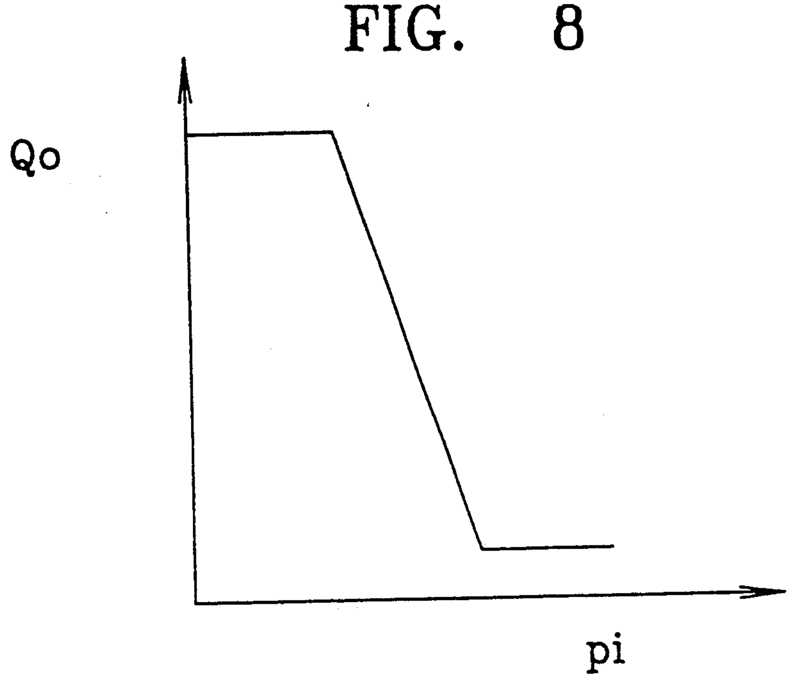
FIG. 8 is a graph illustrating a negative characteristic of a pump regulator; and, FIG. 9 is a diagram showing a characteristic of the pump output to the desired pump discharging flow rate of the manipulator.

FIG. 2 illustrates spools 21a and 21, pilot pistons 22a, 22b and servo pistons 23a and 23b. When pilot pressure from the pressure reducing valves 6a and 6b increases the spools 21a and 21b are moved to the right and the servo pistons 23a and 23b are moved to lower the angle of inclination of the plate in the hydraulic pump 3 to lower the flow rate of hydraulic fluid from the hydraulic pump. On the other hand, if the pilot pressure from the pressure reducing valves 6a and 6b decreases, the flow rate of the hydraulic pump 3 increases. FIG. 8 illustrates the relationship between pilot pressure pi and flow rate Qo.

Figure 9:
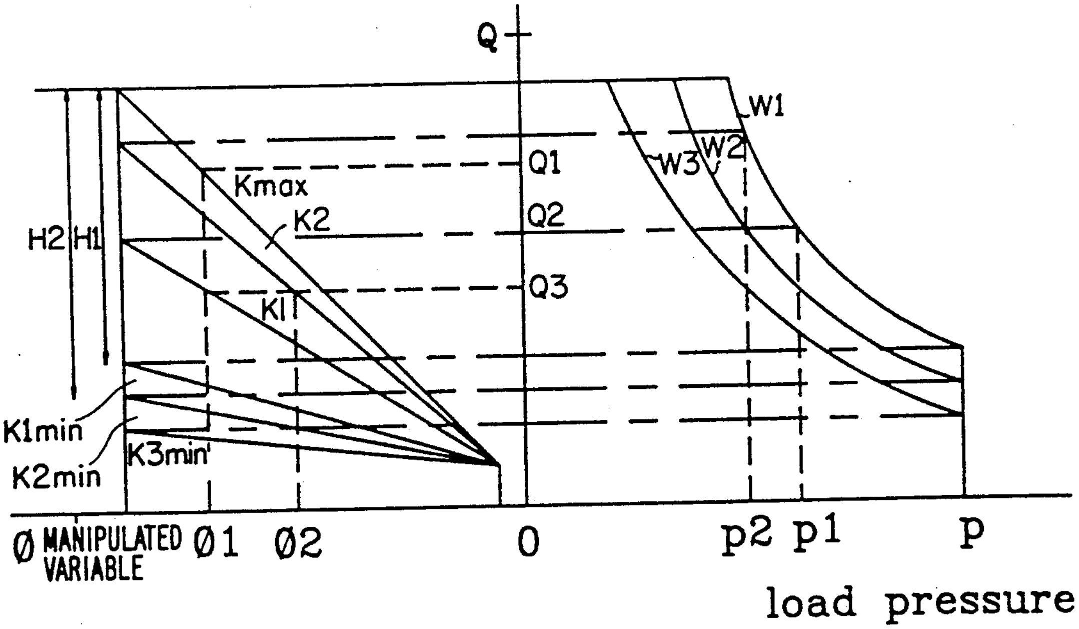

Meanwhile, in the operation of the desired pump flow rate QI at the step 43, the desired pump flow rate Qi is calculated from the input manipulated variable QI set by an operator in consideration of the characteristic diagram of the manipulated variable and the desired pump flow rate, as shown in FIG. 9. Next, the discharge pressure P from the first detector which detects the discharge pressure of the hydraulic pump 3 and the desired flow rate factor K can be increased or decreased by the following relation established between the manipulated pressure and the desired pump flow QI on the basis of the detected pressure. That is:

$$QI=K\times QI$$

where K denotes the factor of the desired flow rate.

As previously noted, the desired flow factor is set to the specified inclination (i.e., K=K max), regardless of the desirably manipulated value of the manipulator 11, to be 100% of QI unless the pressure is varied under the pump discharge pressure P. Accordingly, if the manipulated value is above QI, the desired pump flow is fixed at QI=Q1.

According to the present invention the pump discharge flow can be determined from the relational curve of the desired pump flow rate to the manipulated value of the manipulator 11 corresponding to the variation of the load pressure on the output characteristic curve of the pump in FIG. 2. That is, the discharge flow rate can be determined in a range between the minimum value Kmin and the maximum value Kmax of the desired flow factor K to a factor HI.

In other words, when the manipulated value of the manipulator 11 is Q1 and the pump load pressure is P1, then the desired flow factor K is operated and selected to be K1 and, hence, the desired pump flow becomes Q2.

Moreover, the maximum pump flow allowable for the variation of the load pressure can be increased or decreased in magnitude in accordance with the selected position of the output selector 12. That is, as an output curve W1 of FIG. 9 is selected as the selected position of the output selector 12, the increase or decrease in magnitude of the desired flow factor becomes H1. Therefore, if the position W1 is selected under the load pressure P1, then the desired flow factor becomes K1 and the desired pump flow is thus set to be in Q1. But, if the position W2 is selected under the same pressure, then the factor is set to at K2 and, hence, the desired pump flow becomes Q2. In addition, as the load pressure is varied under the condition a described, the desired pump flow rate may be increased or decreased depending upon the given output curve.

More specifically, when the pump load pressure is decreased from p1 to p2, the desired flow factor K1' is selected in a case of the same output curve W1 while the desired pump flow becomes Q4 in a case of the same position of the manipulated value. Further, even if the composite manipulation of the manipulator 11 is executed, the desired pump flow is operated by applying the characteristic curve of the manipulated value and the desired pump flow as shown in FIG. 9 similar to the operation of the desired flow in a single manipulation of the manipulator. Actuators 9 and 10 receive hydraulic fluid from the hydraulic pump via valves 8.

More specifically, assuming that two actuators 9 and 10 are provided for the single hydraulic pump, when the manipulated variable of the first manipulator is $\phi 1$ and that of the second manipulator is $\phi 2$ under the output diagram W1 of the output selector 12 and the pump load pressure P1, the desired flow factor becomes K1, and the first desired pump flow Q2 and the second desired pump flow Q3 can be produced using the factor K1. When the sum of the first and second desired flow Q2 and Q3 is Qt and the maximum dischargeable flow in the factor K1 is Q1max, if the total of the desired pump flow is equal to or lower than the maximum dischargeable flow (i.e., $Qt \geqq Q1$ max) based upon the comparison of the sum Qt and the maximum dischargeable flow Q1max, then the total desired pump flow is taken as the desired pump flow (that is, QI=Qt).

Alternatively, if the total of the desired pump flow Qt is larger than the maximum dischargeable flow Qmax, that is, Qt<Q1max, the maximum dischargeable flow is selected as the desired pump flow (i.e., QI=Q1max).

Furthermore, a third selector is additionally provided to limit the maximum flow rate of the pump as shown illustrated in FIG. 9. With the use of the third selector, the maximum flow rate can be selected depending upon the kind of work required by the operator and the maximum flow rate can be further determined by the output selector 12.

Accordingly, the pump discharging flow control apparatus can be defined such that the maximum discharging rate Qmax is determined on the basis of the value selected from the characteristic diagram shown in FIG. 9 and the desired pump flow is determined from the pump discharging pressure detected by the first detector with the desired flow factor K.

While the desired flow factor K and the output diagram WI are illustrated in a form of straight line and curve, respectively, it should be noted that the present invention is not limited to the specified form. Accordingly, the diagram may be changed to various formats according to the characteristic of the hydraulic machine or format needed by an operator.

According to the present invention, the desired pump flow is optimally produced depending upon the manipulated variable of the manipulator, the load pressure and the variation in a position of the output diagram selected by the output selector 12 and the result is output as the pump discharging flow to thereby assure the operation capability needed by an operator. As a result, work can be directly and easily executed with a high resolution under a high load pressure. That is, the present invention can achieve the following effects.

Firstly, the operation capability of the apparatus can be improved. The discharge flow of the hydraulic pump can be controlled in a full manipulating range of 100% so that a fine manipulation is easily achieved when operated under the high load area.

Secondly, the output can be previously controlled in accordance with the kinds of work or the level of the load to thereby prevent energy from being lost undesirably and to retain persistence of the machine.

In a conventional negative control or full power control employed to control the discharge flow of the existing hydraulic pump, several control signal input ports for the pump regulator are provided thereto, so the construction is complicated and control accuracy is not good. But, according to the present invention, only a single input port is provided for control of the regulator. Accordingly, the system can be easily constructed with improved control accuracy.

Although the present invention has been described with reference to the specified example, various modifications and changes will be made therein without departing from the spirit and scope of the invention.

What is claimed is:

1. A flow control system for controlling a discharge flow rate of hydraulic fluid discharged from hydraulic pumps comprising:

a motor with at least one of the pumps being a variable capacity hydraulic pump driven by the motor;

a manipulating unit for converting a quantity of work commanded by an operator into an electrical signal;

a plurality of hydraulic actuators driven in accordance with the discharge flow rate;

a plurality of flow control valves for adjusting a flowing direction and an amount of working hydraulic fluid transferred from the hydraulic pumps to the actuators;

an output selector provided with an electronic control device for selecting one of a plurality of output power levels corresponding to the power of the motor;

a first detector for detecting flow pressure of hydraulic fluid discharged form the respective hydraulic pumps;

a controller for receiving signals applied from the manipulating unit, the output selector and the first detector and providing control signals to control the system;

at least one pressure reducing valve for generating a pilot pressure in response to one of the control signals from the controller and generating a regulator control signal, said pressure reducing valve having a plurality of electromagnetic proportional pressure reducing valves; and a regulator for adjusting inclination of an inclined plate in the at least one hydraulic pump in response to the regulator control signal to control the flow rate of the hydraulic fluid to be discharged form the respective hydraulic pumps; and wherein said controller comprises a first operation means for calculating an input required flow rate of said hydraulic pump based upon the electrical signal applied from the manipulator, a second operation means for calculating a maximum dischargeable flow rate of said hydraulic pumps based upon the selected power level from said output selector and the flow pressure from said first detector, a comparator for comparing the input required flow rate with the maximum dischargeable flow rate, a first selector for selecting the maximum dischargeable flow rate as an output flow rate of the hydraulic pumps when the input required flow rate is greater than the maximum dischargeable flow rate, a second selector for selecting the input required flow rate as the output flow rate of the hydraulic pumps when the input required flow rate is less than or equal to the maximum dischargeable flow rate, and means for providing the output flow rate of the hydraulic pumps to said at least one pressure reducing valve.

2. A flow control system according to claim 1 wherein:

said first operation means calculates a desired flow coefficient relative to the command of work by the operator of the manipulating unit and a required flow rate of the at least one variable capacity hydraulic pump in accordance with the detected flow pressure and the selected output power level and calculates the required flow rate of the hydraulic pump dependent on the quantity of work by using the desired flow coefficient.

3. A flow control system according to claim 2 further comprising:

a second detector for detecting a rotational speed of the motor; and wherein said second operation means calculates a difference between the rotational speed and a target rotating speed, calculates a compensating flow rate of the pump by using the selected output power level and the detected flow pressure, and calculates the maximum dischargeable flow rate of the pump by using the compensating flow rate.

* * * * *